United States Patent
Pelfrey

(10) Patent No.: US 8,333,544 B1
(45) Date of Patent: Dec. 18, 2012

(54) CARD SEAL FOR A TURBOMACHINE

(75) Inventor: Philip C Pelfrey, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 584 days.

(21) Appl. No.: 12/541,193

(22) Filed: Aug. 14, 2009

(51) Int. Cl.
*F02C 7/28* (2006.01)
*F16J 15/44* (2006.01)

(52) U.S. Cl. ...... 415/1; 415/111; 415/173.7; 415/174.2; 415/174.5; 415/231

(58) Field of Classification Search ............... 415/1, 110, 415/111, 173.7, 174.2, 174.5, 229, 230, 231
See application file for complete search history.

(56) References Cited

U.S. PATENT DOCUMENTS

| | | | |
|---|---|---|---|
| 6,010,132 A * | 1/2000 | Bagepalli et al. ......... | 415/173.5 |
| 6,267,381 B1 | 7/2001 | Wright | |
| 6,343,792 B1 * | 2/2002 | Shinohara et al. ........... | 277/355 |
| 6,736,597 B2 | 5/2004 | Uehara et al. | |
| 6,874,788 B2 | 4/2005 | Kono | |
| 6,976,680 B2 | 12/2005 | Uehara et al. | |
| 7,066,468 B2 | 6/2006 | Uehara et al. | |
| 7,159,872 B2 | 1/2007 | Nicholson et al. | |
| 7,261,515 B2 | 8/2007 | Nishimoto et al. | |
| 7,419,164 B2 | 9/2008 | Awtar et al. | |
| 7,487,588 B2 | 2/2009 | Hogg et al. | |
| 7,909,335 B2 * | 3/2011 | Turnquist et al. ............. | 277/355 |
| 2002/0105146 A1 | 8/2002 | Uehara et al. | |
| 2005/0194745 A1 | 9/2005 | Hogg | |
| 2008/0169616 A1 * | 7/2008 | Awtar et al. .................... | 277/593 |
| 2009/0304493 A1 * | 12/2009 | Awtar ............... | 415/1 |

* cited by examiner

*Primary Examiner* — Igor Kershteyn
(74) *Attorney, Agent, or Firm* — John Ryznic

(57) ABSTRACT

A card seal with an annular arrangement of plates that form the card seal, where the plates are rotated at an angle around a longitudinal axis of the plates so that the gaps between adjacent plates are not parallel to the rotational axis of the rotor shaft, and where an annular disk is rotatably secured to the rotor shaft and located adjacent to card seal on the low pressure side, or on the high pressure side or even on both sides such that rotation of the annular disk pumps fluid into or draws fluid out from the plate gaps to decrease or eliminate any differential pressure across the card seal. Thus, card seal leakage is reduced or eliminated.

16 Claims, 2 Drawing Sheets

CARD SEAL FOR A TURBOMACHINE

GOVERNMENT LICENSE RIGHTS

None.

CROSS-REFERENCE TO RELATED APPLICATIONS

None.

BACKGROUND OF THE INVENTION

1. Field of the Invention

The present invention relates generally to a dynamic seal, and more specifically to card seal for use in large turbo machines such as gas turbines, steam turbines, compressors, pumps, etc.

2. Description of the Related Art Including Information Disclosed Under 37 CFR 1.97 and 1.98

A gas turbine engine includes a compressor and a turbine each having multiple rows of rotor blades interspaced between stator or guide vanes. In-between each row or stage, a large pressure differential is formed. In the compressor, the pressure increases in the flow direction while in the turbine the pressure decreases. The pressure differential between adjacent stages in the compressor is smaller than in the turbine because of the greater number of stages used in the compressor.

A dynamic seal is used between the rotor and the stator of the turbomachine to limit leakage in order to improve the efficiency of the turbo machine. In the turbine, the leakage is from the hot gas flow passing through the turbine. Hot gas leaking into the rim cavity will expose the rotor disks to the extreme hot temperature. Thus, better seals reduce leakage to increase performance of the turbo machine and to prevent over-exposure of turbomachine parts from excessive temperatures. In one example, the rotor disks in the turbine are made from a high strength material different than the rotor blades or stator vanes that would develop cracks due to thermal stress loads if exposed to high temperature from excessive hot gas leakage into the adjacent rim cavity. This is why purge air is often used in the rim cavities to push out or dilute and hot gas flow leakage that leaks through the dynamic seal and into the rim cavity.

In a turbine of a gas turbine engine, labyrinth seals or brush seals are used for the dynamic seals. In some cases, a combination of brush and labyrinth seals is used because of the characteristics of each. A labyrinth seal makes a good seal at relatively high rotational speeds while the brush seal is best for relatively low rotational speeds. This is due to the use of brushes that rub against the rotating part formed by the dynamic seal. As higher rotational speeds, the brushes will wear out early. Brush seals have less leakage than labyrinth seals, but wear out easily when rubbing at higher speeds. One reason why a turbine uses combinations of lab and brush seals is due to engine transients, which is when the engine is stopped and then restarted. The rotor shaft and the engine casing are made of different materials that have different coefficients of thermal expansion. Thus, the parts grow in a radial direction at different rates due to heat transfer to for from the part. Labyrinth seals are also capable of sealing much higher pressure differentials than brush seals.

Leaf or card seals have been developed in order to provide a better seal that includes benefits from both the lab seals and the brush seals. A card seal is formed of a number of flat plates arranged around a rotor shaft in an annular formation in which a gap formed between adjacent plates due to surface irregularities and is generally parallel to the rotor shaft axis. Each plate is capable of sliding over adjacent plates so as to maintain contact with the rotor shaft surface or float on top thereof. An outer end of the plates is held in a casing while the inner ends float or make contact with the outer surface of the rotor shaft. One side of the plates is exposed to the high pressure side while the other side is exposed to the low pressure. U.S. Pat. No. 6,736,597 issued to Uehara et al on May 18, 2004 and entitled AXIS SEAL MECHANISM AND TURBINE shows one such card seal. This card seal will allow for too much leakage through the small gaps formed between adjacent plates to be useful in the gas turbine engine.

BRIEF SUMMARY OF THE INVENTION

It is an object of the present invention to provide for a card seal with better leakage control through the plates than in the prior art card seals.

It is another object of the present invention to provide for an interstage dynamic seal in a gas turbine engine that will produce less leakage flow than the prior art labyrinth and brush seal combinations.

It is another object of the present invention to provide for an interstage dynamic seal in a gas turbine engine that will replace the prior art combination of labyrinth and brush seals with one seal.

The above objectives and more are achieved with the card seal of the present invention that includes an arrangement of plates arranged around a rotor shaft in which the plates or cards are offset at a angle from the axis of the shaft such that the card gaps are not parallel to the rotational axis, and in which an annular disk that is rotatably secured to the rotor shaft is positioned on the low pressure side of the card seal arrangement to produce a buildup in pressure and reduce or eliminate a differential pressure between the high pressure side. The disk can include a series of paddles to further increase the developed pressure when the card seal is used in high differential pressure environments.

In another embodiment, the annular disk can be located on the high pressure side of the card seal and aligned to draw fluid out from the gaps between adjacent plates such that the differential pressure across the card seal is also decreased.

In still another embodiment, the annular disks can be placed on both sides of the card seal such that the high pressure side annular disk would decrease pressure out from the plates while the low pressure side annular disk would increase the pressure within the plates of the card seal so that both annular disks would function to decrease the pressure differential across the card seal.

DETAILED DESCRIPTION OF THE INVENTION

Figure 1:
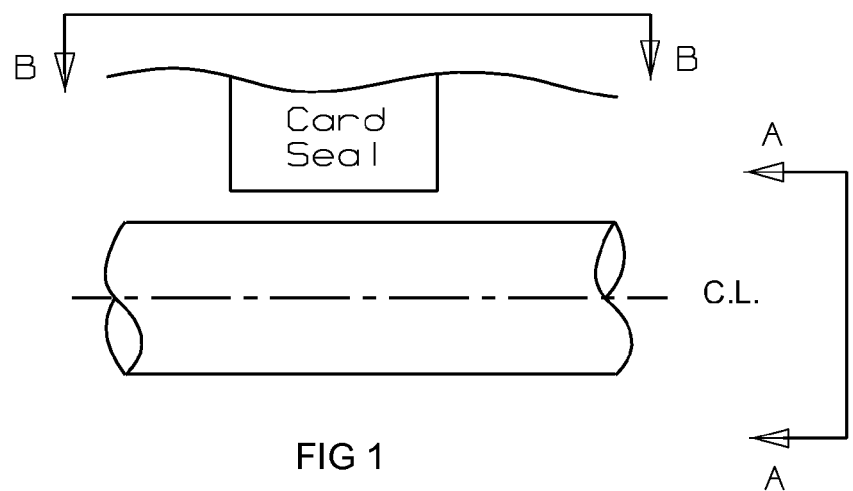
FIG. 1 shows a cross section view of a rotor shaft and card seal arrangement of the prior art.
Figure 2:
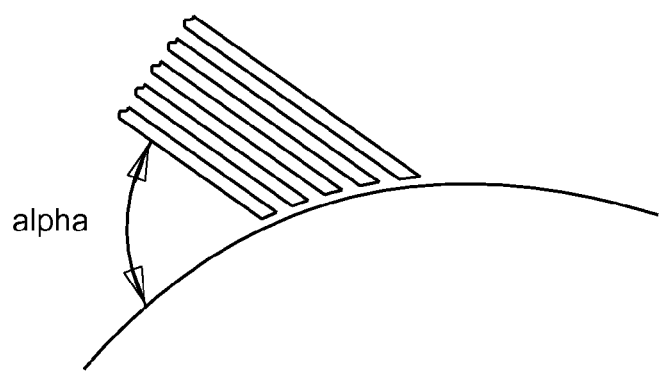
FIG. 2 shows a front view of the card seal arrangement through line A-A of FIG. 1.

The card or leaf seal of the present invention is an improvement over the prior art card seals in that the cards are rotated about the longitudinal axis of the plates so that the gaps or spaces between adjacent plates are not parallel to the rotational axis of the rotor shaft, and in which a disk that is secured to the rotor shaft is located adjacent to the plates on the low pressure side to produce a increase in the pressure to reduce or eliminate the pressure differential between the two sides of the card seal. FIG. 1 shows a plate of a card seal in close contact to an outer surface of a rotor shaft. The plates are stacked against one another to form an annular arrangement around the rotor shaft. The plates are secured to a card seal housing so that each plate can pivot such that adjacent plates can slide over one another. The plates are angled with respect to the rotor shaft as seen in FIG. 2 such that the plates are offset from a normal direction of the rotor shaft surface by an angle of alpha.

Figure 3:
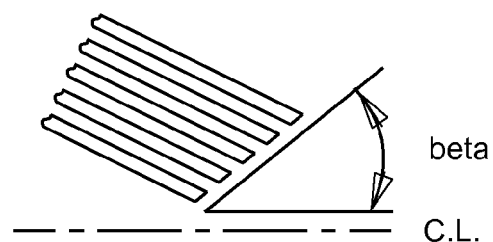
FIG. 3 shows a top view of the card seal arrangement through line B-B of FIG. 1 but with the rotation to the card of the present invention.

The card seal of the present invention also rotates the plates of the card seal about the normal direction by an angle of beta as seen in FIG. 3. Thus, the gaps or spacing between adjacent plates is no longer parallel to the axis of rotation of the rotor shaft as in the prior art card seals. The direction and amount of the rotation of the offset in FIG. 3 will be described.

Figure 4:
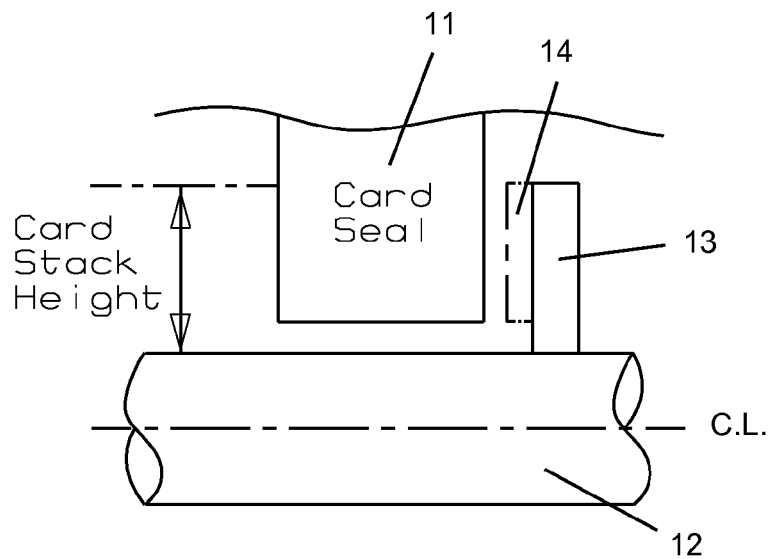
FIG. 4 shows a cross section view of the card shaft and rotor shaft arrangement of the present invention.

FIG. 4 shows the other addition to the card seal of the present invention. A plate 11 of the card seal is shown spaced above the rotor shaft 12 surface and held in the outer casing of the card seal. A high pressure side for the card seal is on the left of this figure while the low pressure side is on the right side. An annular disk 13 is secured to the rotor shaft so that the disk 13 rotates along with the shaft 12 at a location adjacent to the low pressure side of the card seal plates 11. The annular disk 13 rotates along with the rotor shaft 12 to produce a pressure buildup in the fluid between the card seal plates and the annular disk 13. This pressure buildup due to the annular disk will operate to offset or eliminate any pressure differential acting across the card seal. As the pressure differential across the card seal decreases, the leakage passing between the card seal plates will decrease. The annular disk functions as a viscous pump to pump fluid from the annular disk or draw fluid onto the annular disk. This viscous pumping effect is similar to a vacuum pump having a series of flat circular plates that are rotated within a fluid such as air.

In a second embodiment, the annular disk 13 can include an array of paddles or blades 14 that will function to further increase the pressure of the adjacent fluid developed by the rotation of the annular disk 13. The paddles or blades are used when the differential pressure across the card seal is large.

The direction of rotation of the rotor shaft 12 is shown by the arrow in FIG. 4 which is the same direction of rotation of the annular disk 13. When the fluid is pressurized by the rotating annular disk, the pressurized fluid will have both a circumferential direction of motion and an axial direction of motion away from the annular disk 13. The net direction of motion should be close to the angle beta shown in FIG. 3 in which the plates of the card seal are rotated. The most efficient leakage prevention of the card seal in the present invention will occur when the fluid driven off from the annular disk 13 is directed parallel to the spaces formed between the adjacent plates in the card seal. Thus, the angle beta of the plate rotation can be varied depending upon the differential pressure across the card seal and the pressure buildup of the rotating annular disk 13.

Figure 5:
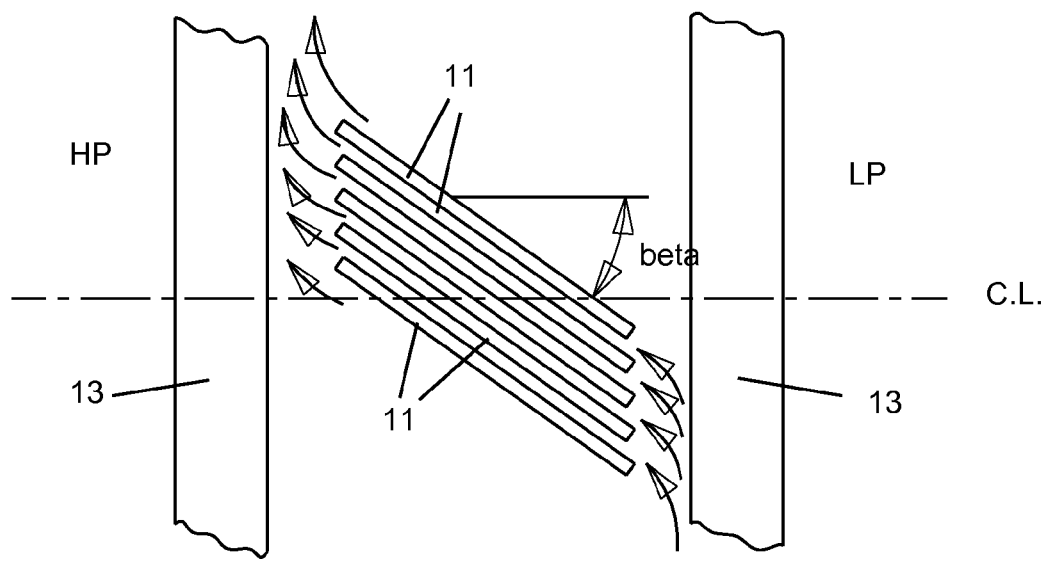
FIG. 5 shows a top view of the card seal arrangement with annular disks located on both sides of the card seal.

The annular disk 13 can also be used on the high pressure side of the card seal such that the rotating annular disk will decrease the pressure by drawing fluid out from the gaps between adjacent plates. FIG. 5 shows an embodiment in which the card seal assembly includes a low pressure side annular disk and a high pressure side annular disk both rotatably connected to the same rotor shaft. FIG. 5 also clearly shows how the plates are angle or offset at the angle beta with respect to the rotation axis center line (CL) so that the fluid pushed away or drawn toward the annular disk will be aligned with the gaps between plates.

The card seal of the present invention can be used in a gas turbine engine where the labyrinth seals or the brush seals are currently being used. For example, one larger card seal can be used between the outer shroud of the stator vane assembly and the rotor shaft. This is the interstage seal assembly. A smaller card seal can be used to seal the vane platforms with the rotor blade platforms in which a lab seal was typically used. In either case, the card seal can maintain a good seal even when the relative spacing between the seal support and the seal face changes due to thermal growths like that in engine transients.

I claim the following:

1. A card seal comprising:
a card seal housing;
a plurality of card seal plates stacked against each other to form an annular arrangement around a rotor shaft;
the annular arrangement of plates having a high pressure side and a low pressure side;
the plates being offset at an angle beta with respect to a rotational axis of the rotor shaft; and,
an annular disk rotatably secured to the rotor shaft and positioned adjacent to the card seal plates such that rotation of the annular disk reduces a differential pressure across the card seal plates.

2. The card seal of claim 1, and further comprising:
the annular disk includes a plurality of paddles to increase a pressure buildup produced by rotation of the annular disk.

3. The card seal of claim 1, and further comprising:
the angle of rotation beta of the plates is substantially parallel to a direction of fluid from either from or to the annular disk.

4. The card seal of claim 1, and further comprising:
the annular disk is located on the low pressure side of the card seal; and,
rotation of the annular disk pumps fluid into gaps between the plates to decrease the differential pressure across the card seal.

5. The card seal of claim 4, and further comprising:
a second annular disk is located on the high pressure side of the card seal; and,
rotation of the second annular disk draws fluid from the gaps between the plates to decrease the differential pressure across the card seal.

6. The card seal of claim 1, and further comprising:
the annular disk is located on the high pressure side of the card seal; and,
rotation of the annular disk draws fluid from gaps between the plates to decrease the differential pressure across the card seal.

7. A gas turbine engine comprising:
a turbine with a row of stator vanes positioned between two rows of rotor blades;
an interstage seal support assembly extending from an inner shroud of the stator vanes to support an interstage seal;
a card seal secured to the interstage seal support to form a seal against a rotor disk, the card seal comprising:
a card seal housing;
a plurality of card seal plates stacked against each other to form an annular arrangement around a rotor shaft;
the annular arrangement of plates having a high pressure side and a low pressure side;

the plates being offset at an angle beta with respect to a rotational axis of the rotor shaft; and, an annular disk rotatably secured to the rotor shaft and positioned adjacent to the card seal plates such that rotation of the annular disk reduces a differential pressure across the card seal plates.

8. The gas turbine engine of claim 7, and further comprising:

the annular disk includes a plurality of paddles to increase a pressure buildup produced by rotation of the annular disk.

9. The gas turbine engine of claim 7, and further comprising:

the angle of rotation beta of the plates is substantially parallel to a direction of fluid from either from or to the annular disk.

10. The gas turbine engine of claim 7, and further comprising:

the annular disk is located on the low pressure side of the card seal; and, rotation of the annular disk pumps fluid into gaps between the plates to decrease the differential pressure across the card seal.

11. The gas turbine engine of claim 10, and further comprising:

a second annular disk is located on the high pressure side of the card seal; and, rotation of the second annular disk draws fluid from the gaps between the plates to decrease the differential pressure across the card seal.

12. The gas turbine engine of claim 7, and further comprising:

the annular disk is located on the high pressure side of the card seal; and, rotation of the annular disk draws fluid from gaps between the plates to decrease the differential pressure across the card seal.

13. A process for decreasing leakage flow across a card seal, the card seal comprising an annular arrangement of stacked plates with an upstream end and a downstream end and an inner end forming a seal with a rotating shaft, the process comprising the steps of:

rotating the plates around a longitudinal axis of the plates so that a space between adjacent plates is not parallel to an axis of rotation of the rotating shaft; and, inducing an increase in pressure on a low pressure side of the card seal or a decrease in pressure on a high pressure side of the card seal to reduce a differential pressure occurring across the card seal.

14. The process for decreasing leakage flow across a card seal of claim 13, and further comprising the step of:

securing an annular disk to the rotary shaft located adjacent to the card seal such that rotation of the annular disk induces the increase or decrease in pressure.

15. The process for decreasing leakage flow across a card seal of claim 14, and further comprising the step of:

securing an annular disk to the rotating shaft on both sides of the card seal.

16. The process for decreasing leakage flow across a card seal of claim 14, and further comprising the step of:

rotating the plates in a direction of the rotating shaft rotation such that the spacing between the plates is aligned with a direction in which a fluid is drawn from or away from the annular disk as the annular disk rotates.

* * * * *